(12) United States Patent
Saito et al.

(10) Patent No.: US 11,586,410 B2
(45) Date of Patent: Feb. 21, 2023

(54) INFORMATION PROCESSING DEVICE, INFORMATION PROCESSING TERMINAL, INFORMATION PROCESSING METHOD, AND PROGRAM

(71) Applicant: Sony Corporation, Tokyo (JP)

(72) Inventors: Mari Saito, Kanagawa (JP); Hiro Iwase, Kanagawa (JP); Shinichi Kawano, Tokyo (JP); Yuhei Taki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 174 days.

(21) Appl. No.: 16/647,018

(22) PCT Filed: Jun. 19, 2018

(86) PCT No.: PCT/JP2018/023198
§ 371 (c)(1),
(2) Date: Mar. 13, 2020

(87) PCT Pub. No.: WO2019/058673
PCT Pub. Date: Mar. 28, 2019

(65) Prior Publication Data
US 2020/0272407 A1  Aug. 27, 2020

(30) Foreign Application Priority Data

Sep. 21, 2017  (JP) .............................. JP2017-181166

(51) Int. Cl.
*G06F 17/00* (2019.01)
*G06F 3/16* (2006.01)
(Continued)

(52) U.S. Cl.
CPC ................. *G06F 3/16* (2013.01); *G06N 5/04* (2013.01); *G10L 25/54* (2013.01); *H04R 3/04* (2013.01)

(58) Field of Classification Search
CPC .. G06F 3/16; G06N 5/04; G10L 25/54; H04R 3/04
(Continued)

(56) References Cited

U.S. PATENT DOCUMENTS 11,003,417 B2 * 5/2021 Choi ...................... G10L 17/24
2004/0167781 A1 8/2004 Hirayama
(Continued)

FOREIGN PATENT DOCUMENTS

| JP | 09-329458 A | 12/1997 |
|---|---|---|
| JP | 10-288532 A | 10/1998 |

(Continued)

OTHER PUBLICATIONS

International Search Report and Written Opinion dated Aug. 21, 2018 for PCT/JP2018/023198 filed on Jun. 19, 2018, 10 pages including English Translation of the International Search Report.

*Primary Examiner* — Paul C McCord
(74) *Attorney, Agent, or Firm* — Xsensus LLP

(57) ABSTRACT

[Problem] The problem of the present disclosure relates to proposing an information processing device, an information processing terminal, an information processing method, and a program, which are capable of controlling the output of a voice so as to be adaptive to an action purpose of a user.

[Solution] An information processing device including: an inference unit that infers an action purpose of a user on the basis of a result of sensing by one or more sensors; and an output control unit that controls, on the basis of a result of inference by the inference unit, output of a voice to the user performed by an audio output unit.

17 Claims, 9 Drawing Sheets

(51) Int. Cl.
  *G06N 5/04* (2023.01)
  *G10L 25/54* (2013.01)
  *H04R 3/04* (2006.01)
(58) Field of Classification Search
  USPC ........................................................ 704/200
  See application file for complete search history.

(56) References Cited

U.S. PATENT DOCUMENTS

| | | |
|---|---|---|
| 2005/0261905 A1 | 11/2005 | Pyo et al. |
| 2015/0186156 A1* | 7/2015 | Brown .................... H04L 51/02 715/706 |
| 2016/0156771 A1 | 6/2016 | Lee |
| 2018/0108343 A1* | 4/2018 | Stevans .................. G10L 15/26 |
| 2018/0174577 A1* | 6/2018 | Jothilingam ............ G10L 15/07 |

FOREIGN PATENT DOCUMENTS

| | | | |
|---|---|---|---|
| JP | 2004-226711 A | 8/2004 |
| JP | 2009-99033 A | 5/2009 |
| WO | 2016/136062 A1 | 9/2016 |
| WO | 2017/130486 A1 | 8/2017 |

* cited by examiner

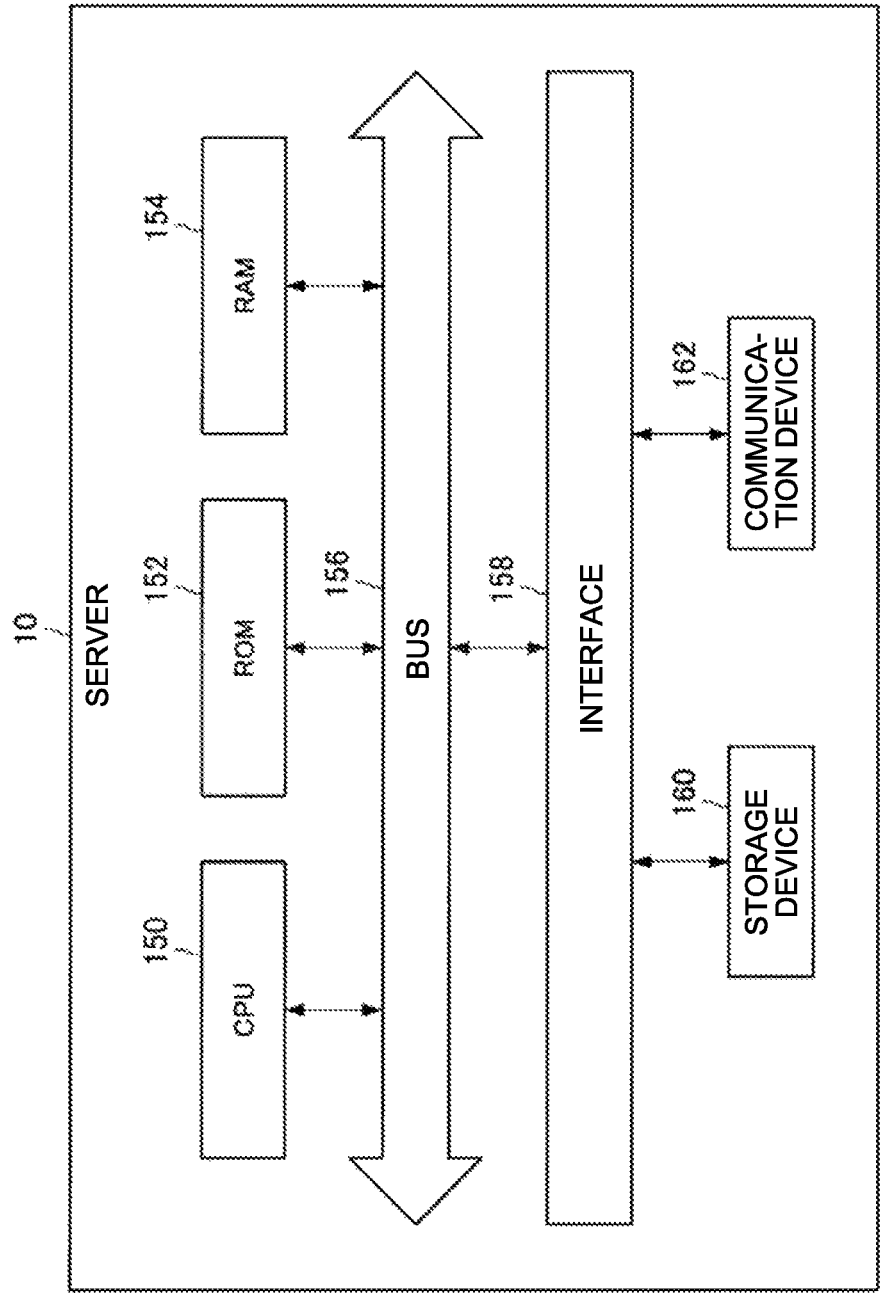

INFORMATION PROCESSING DEVICE, INFORMATION PROCESSING TERMINAL, INFORMATION PROCESSING METHOD, AND PROGRAM

CROSS-REFERENCE TO RELATED APPLICATIONS

The present application is based on PCT filing PCT/JP2018/023198, filed Jun. 19, 2018, which claims priority to JP 2017-181166, filed Sep. 21, 2017, the entire contents of each are incorporated herein by reference.

FIELD

The present disclosure relates to an information processing device, an information processing terminal, an information processing method, and a program.

BACKGROUND

Conventionally, various kinds of technologies for adjusting output characteristics of audio equipment are proposed.

For example, the undermentioned Patent Literature 1 discloses the technology for, in a scene in which a plurality of persons and a telephone call partner in a vehicle mutually talk by using hands-free telephones, adjusting sound quality for persons who are currently talking in the vehicle.

CITATION LIST

Patent Literature

Patent Literature 1: JP 2011-205389 A

SUMMARY

Technical Problem

However, in the technology described in Patent Literature 1, the feature in which the output of a voice is controlled so as to be adaptive to an action purpose of a user is not taken into consideration.

Accordingly, the present disclosure proposes an information processing device, an information processing terminal, an information processing method, and a program, which are capable of controlling the output of a voice so as to be adaptive to an action purpose of a user, and which are novel and improved.

Solution to Problem

According to the present disclosure, an information processing device is provided that includes: an inference unit that infers an action purpose of a user on the basis of a result of sensing by one or more sensors; and an output control unit that controls, on the basis of a result of inference by the inference unit, output of a voice to the user performed by an audio output unit.

Moreover, according to the present disclosure, an information processing terminal is provided that includes: a receiving unit that receives an inference result of inferring an action purpose of a user, the action purpose of the user having been inferred on the basis of a result of sensing by one or more sensors; and an output control unit that controls output of a voice to the user on the basis of the received inference result of inferring the action purpose of the user.

Moreover, according to the present disclosure, an information processing method is provided that includes: inferring an action purpose of a user on the basis of a result of sensing by one or more sensors; and on the basis of a result of the inference, controlling output of a voice to the user performed by an audio output unit.

Moreover, according to the present disclosure, a program is provided that causes a computer to function as: an inference unit that infers an action purpose of a user on the basis of a result of sensing by one or more sensors; and an output control unit that controls, on the basis of a result of inference by the inference unit, output of a voice to the user performed by an audio output unit.

Advantageous Effects of Invention

As described above, according to the present disclosure, the output of a voice can be controlled so as to be adaptive to an action purpose of a user. It should be noted that the effects described herein are not necessarily limited, and may be any one of the effects described in the present disclosure.

BRIEF DESCRIPTION OF DRAWINGS

FIG. 9 is an explanatory diagram illustrating a hardware configuration example of the server 10 shared by each embodiment.

DESCRIPTION OF EMBODIMENTS

Preferred embodiments of the present disclosure will be detailed below with reference to the accompanying drawings. It should be noted that components, described herein and on the drawings, having substantially identical functional configurations are provided with identical reference numbers, and explanation thereof will not be repeated.

In addition, the "embodiments for carrying out the invention" will be described according to the order of items shown below.

1. Configuration of information processing system
2. First Embodiment
3. Second Embodiment
4. Hardware configuration
5. Modified examples

1. Configuration of Information Processing System

Figure 1:
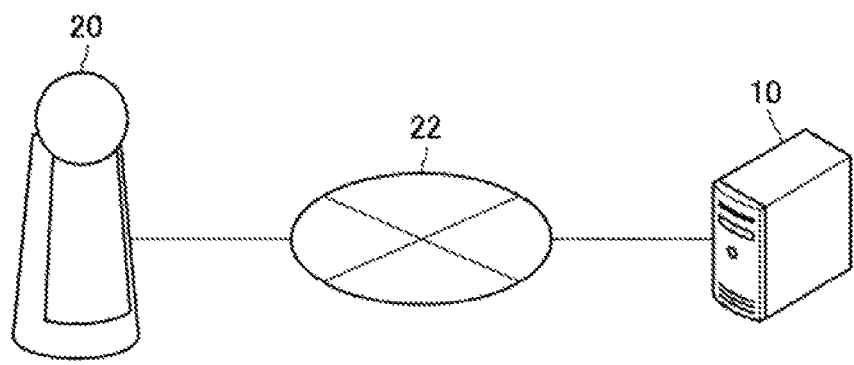
FIG. 1 is an explanatory diagram illustrating a configuration example of an information processing system shared by each embodiment of the present disclosure.

First of all, a configuration example of an information processing system shared by each embodiment of the present disclosure will be described with reference to FIG. 1. As illustrated in FIG. 1, the information processing system according to each embodiment includes a server 10, a terminal 20, and a communication network 22.

1-1. Server 10

The server 10 is an example of the information processing device according to the present disclosure. The server 10 is a device that controls voice output of the undermentioned terminal 20. For example, the server 10 transmits an instruction to output, for example, a voice that provides notification of various information such as weather information, a voice used to talk with a user, and the like, to the terminal 20 through the communication network 22. Here, the voice may be, for example, a synthetic voice by Text To Speech (TTS) or the like, or a recording voice. An explanation will be made below focusing on an example in which the voice is a synthetic voice.

1-2. Terminal 20

The terminal 20 is an example of the information processing terminal according to the present disclosure. The terminal 20 is, for example, a stationary type apparatus, a portable type apparatus, a wearable type apparatus, or the like. An explanation will be made below focusing on an example in which the terminal 20 is a stationary type apparatus In each embodiment, the terminal 20 can be arranged inside a predetermined space (for example, an individual room in a predetermined facility (a house, an office building or the like), a vehicle, the outdoors, or the like). In addition, the terminal 20 is capable of outputting various voices to a user located in a space in which the terminal 20 is arranged according to, for example, the control of the server 10. For example, the terminal 20 converts a character string given in instruction by the server 10 into a voice by TTS, and then outputs the converted voice.

1-3. Communication Network 22

The communication network 22 is a wired or wireless transmission path of information transmitted from a device connected to the communication network 22. For example, the communication network 22 may include: a public network such as a telephone network, the Internet, and a satellite communication network; various kinds of Local Area Network (LAN) and Wide Area Network (WAN) including Ethernet (registered trademark); and the like. In addition, the communication network 22 may include a leased line network such as Internet Protocol-Virtual Private Network (IP-VPN).

1-4. Organization of Problems

The configuration of the information processing system shared by each embodiment has been explained above. Incidentally, in general, acoustic characteristics of a room may change depending on environmental sound and a state of a user's action. Therefore, according to a kind and state of the room, acoustic characteristics of a voice that is actually conveyed to a user may differ from preset acoustic characteristics. Accordingly, in order to convey, to the user, a voice that conforms to the preset acoustic characteristics, there can be considered a method in which acoustic characteristics of a space where the terminal 20 is located are measured in detail every time, and, at the same time, in which voice output is adjusted by using results of the measurements. However, this method requires a certain length of working time. Therefore, in a scene in which a notification or the like is sent to a user, there is a possibility that immediacy will be lost.

As another problem, in a scene in which a voice (speaking) is output, differently from, for example, audio or the like, desirable acoustic characteristics may differ depending on a user's action purpose.

Accordingly, considering the above-described circumstance as one viewpoint, the server 10 according to each embodiment has been devised. The server 10 infers an action purpose of a user on the basis of a result of sensing by the terminal 20, and then controls output of a voice to the user performed by the terminal 20 on the basis of a result of the inference. This enables to control the output of the voice so as to be adaptive to the user's action purpose. Contents of each embodiment such as that described above will be successively detailed below.

2. First Embodiment

2-1. Configuration: Terminal 20

Figure 2:
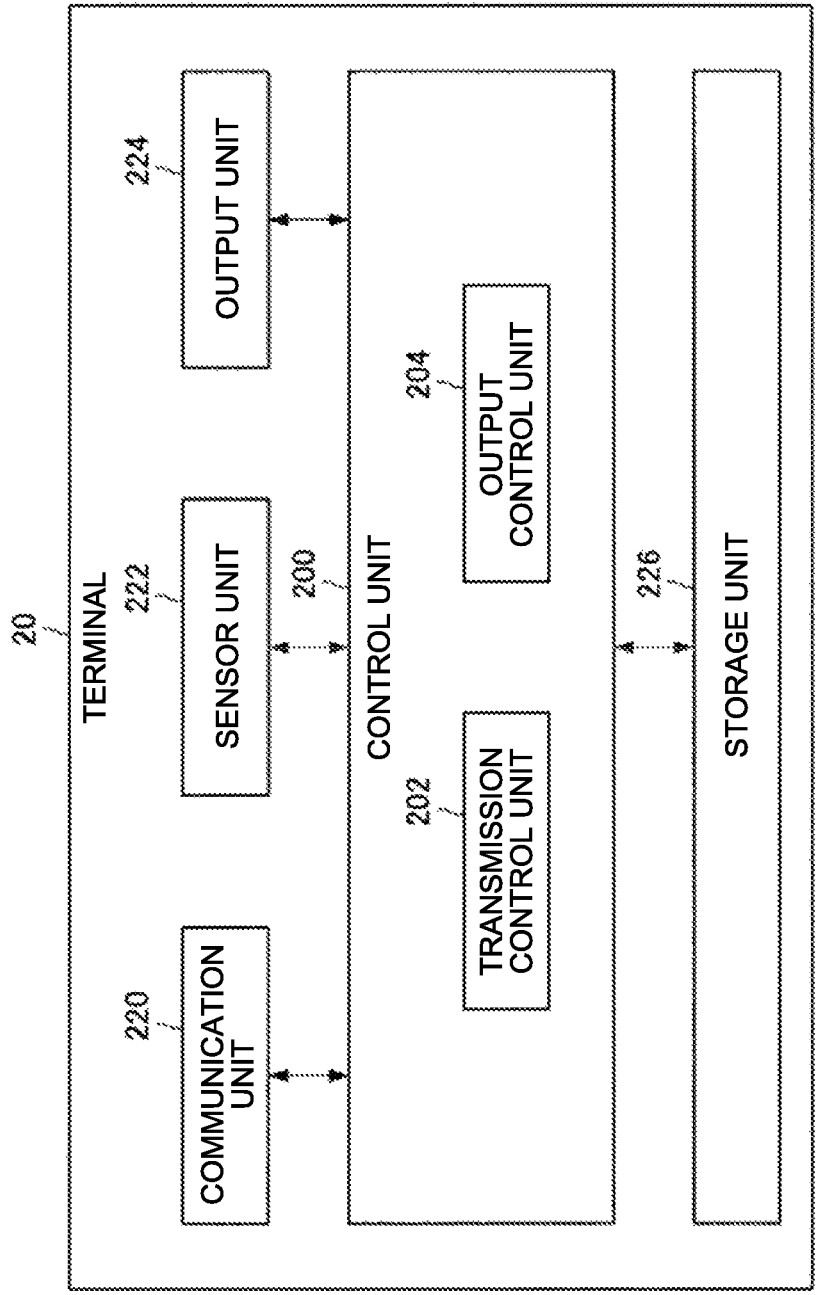
FIG. 2 is a functional block diagram illustrating a configuration example of a terminal 20 according to a first embodiment.

First of all, the first embodiment will be described. FIG. 2 is a functional block diagram illustrating a configuration example of the terminal 20 according to the first embodiment. As illustrated in FIG. 2, the terminal 20 includes a control unit 200, a communication unit 220, a sensor unit 222, an output unit 224, and a storage unit 226.

2-1-1. Sensor Unit 222

The sensor unit 222 can include, for example, a camera (image sensor), a microphone, and the like. For example, the camera of the sensor unit 222 captures a video image in front of a lens of the camera. In addition, the microphone of the sensor unit 222 collects sound around the terminal 20.

2-1-2. Control Unit 200

The control unit 200 can include, for example, a processing circuit such as a Central Processing Unit (CPU), and a Graphics Processing Unit (GPU). The control unit 200 comprehensively controls operation of the terminal 20. In addition, as illustrated in FIG. 2, the control unit 200 includes a transmission control unit 202, and an output control unit 204.

2-1-3. Transmission Control Unit 202

The transmission control unit 202 controls transmission of various kinds of information to other devices. For example, the transmission control unit 202 causes the undermentioned communication unit 220 to transmit various information sensed by the sensor unit 222 to the server 10.

2-1-4. Output Control Unit 204

The output control unit 204 controls output of information performed by the undermentioned output unit 224. For example, the output control unit 204 causes the output unit 224 to output a voice according to control information received from the server 10. As an example, the output control unit 204 converts, by TTS, a character string given in instruction by the control information received from the server 10 into a voice, and then causes the output unit 224 to output the converted voice according to acoustic characteristics given in instruction by the control information.

Here, the acoustic characteristics of the voice can be physical characteristics of the voice. For example, the acoustic characteristics of the voice include volume of the voice, pitch of the voice, speed of the voice, and the like.

2-1-5. Communication Unit 220

The communication unit 220 is an example of a receiving unit according to the present disclosure. The communication unit 220 transmits/receives information to/from other devices through, for example, the communication network 22. For example, the communication unit 220 receives control information from the server 10, the control information being used to cause a voice to be output.

2-1-6. Output Unit 224

The output unit 224 outputs various information (a voice, a video image, etc.) according to the control of the output control unit 204. The output unit 224 can include an audio output unit. The audio output unit includes, for example, a speaker, an earphone, a headphone, or the like. The audio output unit outputs a sound according to the control of the output control unit 204.

Moreover, the output unit 224 can include a display unit. The display unit includes, for example, a Liquid Crystal Display (LCD), an Organic Light Emitting Diode (OLED) etc.), a projector, or the like.

2-1-7. Storage Unit 226

The storage unit 226 stores various kinds of data and various kinds of software.

2-2. Configuration: Server 10

Figure 3:
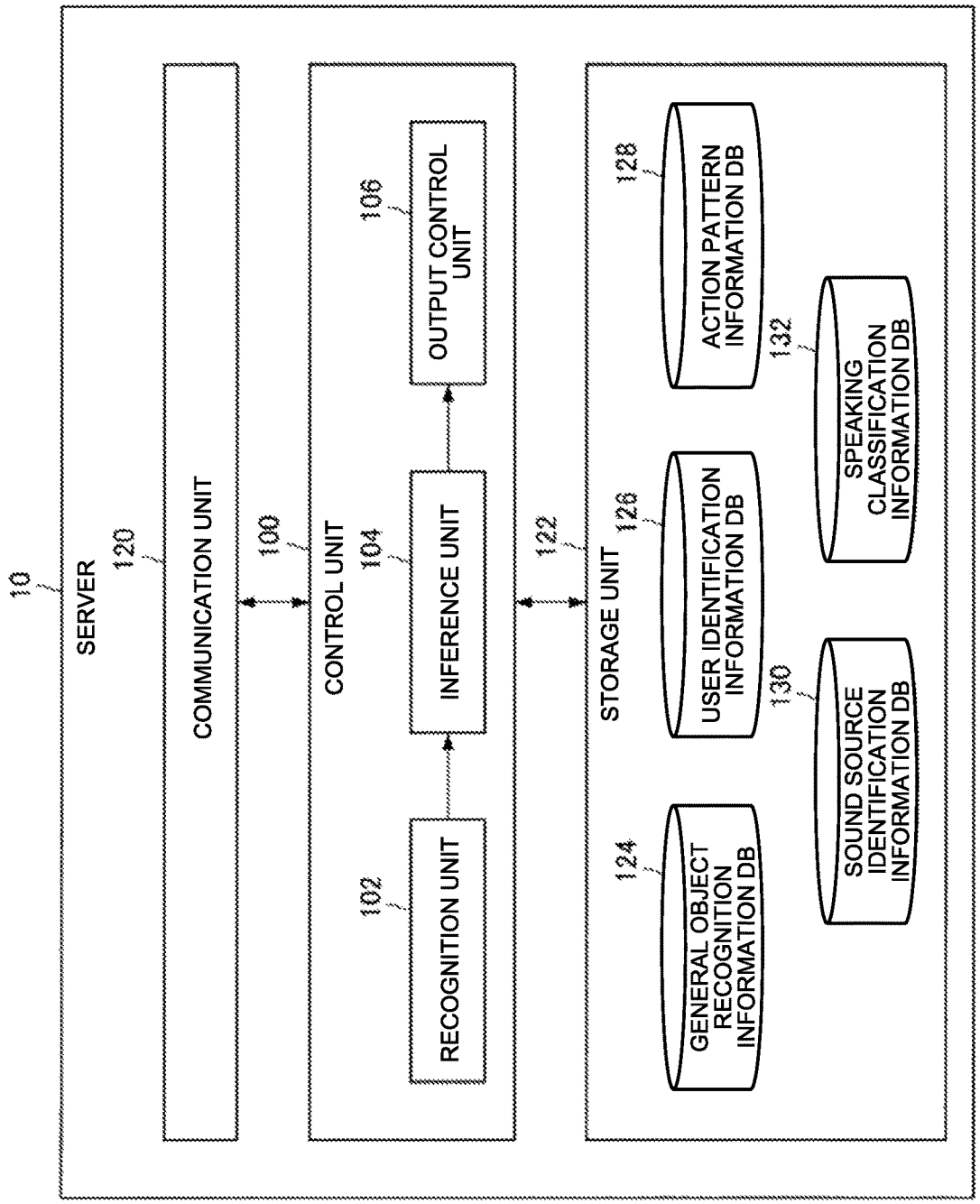
FIG. 3 is a functional block diagram illustrating a configuration example of a server 10 according to the first embodiment.

Next, a configuration of the server 10 according to the first embodiment will be described with reference to FIG. 3. FIG. 3 is a functional block diagram illustrating a configuration example of the server 10 according to the first embodiment. As illustrated in FIG. 3, the server 10 includes a control unit 100, a communication unit 120, and a storage unit 122.

2-2-1. Control Unit 100

The control unit 100 can include, for example, a processing circuit such as the undermentioned CPU 150 and a GPU. The control unit 100 comprehensively controls operation of the server 10. In addition, as illustrated in FIG. 3, the control unit 100 includes a recognition unit 102, an inference unit 104, and an output control unit 106.

2-2-2. Recognition Unit 102

The recognition unit 102 subjects a sensing result received from the terminal 20 to various recognition processing. For example, the recognition unit 102 performs individual object recognition processing, user recognition processing, space recognition processing, and sound recognition processing on the basis of a sensing result received from the terminal 20.

(2-2-2-1. Individual Object Recognition Processing)

First of all, contents of "individual object recognition processing" will be described. For example, the recognition unit 102 subjects an image received from the terminal 20 to general object recognition by using general object recognition information DB 124 stored in the storage unit 122, and thereby recognizes kinds of individual objects included in the image. Here, the general object recognition information DB 124 can be a database that stores information used to identify kinds of objects (for example, furniture, wall, window, etc.).

(2-2-2-2. User Recognition Processing)

Next, contents of "user recognition processing" will be described. For example, in a case where an image (a moving image, etc.) received from the terminal 20 includes a user, the recognition unit 102 analyzes the image by using an action pattern information DB 128 stored in the storage unit 122, and thereby recognizes an action (an action pattern, etc.) of the user and a state of the user. Moreover, the recognition unit 102 is capable of identifying who the user is by using, for example, a user identification information DB 126 stored in the storage unit 122.

(2-2-2-3. Space Recognition Processing)

Next, contents of "space recognition processing" will be described. For example, the recognition unit 102 recognizes a kind of a space (for example, a room) in which the terminal 20 is located on the basis of the image received from the terminal 20, and a recognition result of recognizing the action pattern of the user (by the recognition unit 102). As an example, in a case where it has been recognized that there is a bed in the space, and that a length of stay time of the user in the space is longer than or equal to predetermined time in a midnight time zone, the recognition unit 102 may recognize that the space is a "bedroom". In addition, in a case where it has been recognized that there is a desk in the space, and that a child mainly stays in the space, the recognition unit 102 may recognize that the space is a "child's room". Moreover, in a case where it has been recognized that there is a large screen television receiver in the space, and that a large number of persons stay in the space, the recognition unit 102 may recognize that the space is a "living room". Further, in a case where it has been recognized that the space is a closed space, and at the same time, it has been sensed that position information of the space has changed, the recognition unit 102 may recognize that the space is "inside a vehicle". Furthermore, in a case where there is neither furniture nor ceiling detected in the space, the recognition unit 102 may recognize that the space is "the outdoors".

(2-2-2-4. Sound Recognition Processing)

Next, contents of "sound recognition processing" will be described. For example, the recognition unit 102 further recognizes environmental sound and user's speaking in the space in which the terminal 20 is located by analyzing a sound collection result received from the terminal 20. As an example, the recognition unit 102 identifies a sound source of the collected sound by analyzing the sound collection result using a sound source identification information DB 130 stored in the storage unit 122. In addition, the recognition unit 102 subjects collected voice to voice recognition, and thereby converts the voice into a character string. Here, the sound source identification information DB 130 can be a database that stores, for example, frequency, duration and sound volume for each kind of sound source, sound occurrence frequency information for each time zone, and the like.

It should be noted that every time a sensing result is received from the terminal 20, the recognition unit 102 may successively perform various recognition processing on the basis of the newly received sensing result.

2-2-3. Inference Unit 104

The inference unit 104 infers an action purpose of a user on the basis of a recognition result of recognition by the recognition unit 102. For example, on the basis of a result of recognizing an action of a user by the recognition unit 102, and a result of recognizing, by the recognition unit 102, a kind of a room in which the user is located, the inference unit 104 infers an action purpose of the user. As an example, in a case where it has been recognized that a kind of the room in which the user is located is a "study room", and that the user is "sitting on a chair and has a pencil" as an action of the user, it may be inferred that the action purpose of the user is "study". In addition, in a case where it has been recognized that a kind of the room in which the user is located is a "living room", and that the user is "studying" as an action of the user, it may be inferred that the action purpose of the user is "study". Alternatively, in a case where it has been recognized that the user is referring to a book, the inference unit 104 may infer the action purpose of the user on the basis of a recognition result of recognizing a title, contents and the like of the book. For example, in a case where it has been recognized that a book referred to by the user is a textbook, an academic book or the like, it may be inferred that the action purpose of the user is "study".

It should be noted that every time a sensing result is received from the terminal 20, the inference unit 104 may successively infer the action purpose of the user on the basis of recognition processing that has been performed by the recognition unit 102 on the basis of the newly received sensing result.

(2-2-3-1. Modified Example)

As a modified example, in a case where it is difficult to infer an action purpose of a user from the result of action recognition of the user, the inference unit 104 may infer the use of the space in which the user is located as the action purpose of the user, the use of the space having been recognized by the recognition unit 102. For example, in a case where the space in which the user is located is a "study room", the inference unit 104 may infer that the action purpose of the user is "study" (that is the use of the "study room").

2-2-4. Output Control Unit 106

(2-2-4-1. Change of Acoustic Characteristics)

The output control unit 106 controls voice output by the terminal 20 on the basis of a result of inference by the inference unit 104. For example, the output control unit 106 causes acoustic characteristics of a voice output by (the output unit 224) of the terminal 20 to be changed on the basis of the result of inference by the inference unit 104. As an example, in a case where it has been inferred that the action purpose of the user is "sleep" (or in a case where it has been recognized that the space in which the user is located is a "bedroom"), the output control unit 106 may cause the volume of the voice output by the terminal 20 to be lower than the standard, and may cause the pitch to be lower than the standard. Consequently, even in a case where the user is in the bedroom, the acoustic characteristics can be adjusted in such a manner that the user does not feel annoyed with the output voice.

In addition, in a case where it has been inferred that the action purpose of the user is "study" (or, in a case where it has been recognized that the space in which the user is located is a "study room"), the output control unit 106 may cause the speed of the voice output by the terminal 20 to be slower than the standard. This enables the user who is a child to hear the output voice easily.

Further, in a case where it has been inferred that the action purpose of the user is "party", "happy family fireside", or the like (or, in a case where it has been recognized that the space in which the user is located is "the outdoors" or a "living room", and that a plurality of users are located in the space), the output control unit 106 may cause the volume of the voice output by the terminal 20 to be higher than the standard, may cause the pitch to be higher than the standard, and may cause the speed to be slower than the standard. Alternatively, in this case, the output control unit 106 may cause a variable range of values of pitch and speed of the voice output by the terminal 20 to be wider than usual. This enables exaggerated expressions. As the result, individual users can easily hear the voice, or a more active presentation can be made.

Modified Example 1

As a modified example, the output control unit 106 may cause the acoustic characteristics of the voice output by the terminal 20 to be changed further on the basis of information (sound collection result, etc.) related to sound occurring in a place where the user is located. For example, acoustic characteristics of environmental sound (for example, sounds of various electronic apparatuses (an air-conditioner, a television receiver, etc.), cooking sounds, etc.) that customarily occurs, and acoustic characteristics of user's speaking, may be recorded beforehand on a room basis. In this case, the output control unit 106 may cause the acoustic characteristics of the voice output by the terminal 20 to be changed on the basis of the recorded information. As an example, in a case where a place where the user is located is a "kitchen", and in a case where a time zone in which a voice is output by the terminal 20 is a time zone of cooking, the output control unit 106 may cause the acoustic characteristics of the voice output by the terminal 20 to differ from cooking sound, and may cause the volume to be higher than the standard.

In general, in a "bedroom", a late-night "living room" or the like, environmental sound steadily tends to be small. Accordingly, in a case where a place where the user is located is a "bedroom", or in a case where a time zone is late night, and at the same time, the place where the user is located is a "living room", the output control unit 106 may cause the volume of the voice output by the terminal 20 to be lower than the standard, may cause the speed to be slower than the standard, and at the same time, may cause the pitch to be lower than the standard.

In addition, in a case where the number of users who exist in one room is small, the output control unit 106 may cause the volume of the voice output by the terminal 20 to be lower than the standard. Further, with respect to a room in which a frequency of speaking to each other by a plurality of indoor users tends to be low, or a time zone having such a tendency, the output control unit 106 may cause the volume of the voice output by the terminal 20 to be lower than the standard.

Modified Example 2

As another modified example, the output control unit 106 may cause the acoustic characteristics of the voice output by the terminal 20 to be changed further according to a sensing result of sensing user's speaking. For example, in a case where it has been sensed that the volume of user's speaking to the terminal 20, or the volume of speaking to each other by users, is low (for example, talking to in a whisper, etc.), the output control unit 106 may cause the terminal 20 to output a voice "in a whisper". In addition, in a case where it has been recognized that the user who is speaking is a child, the output control unit 106 may cause the terminal 20 to output a voice having childish speaking characteristics (for example, speed is slower than the standard).

Modified Example 3

As another modified example, the output control unit 106 may cause the acoustic characteristics of the voice output by the terminal 20 to be changed further according to a topic corresponding to the voice output to the user. For example, when content of language learning is output by the terminal 20, the output control unit 106 may further emphasize a change in strength of acoustic characteristics of the voice (of the content) output by the terminal 20. In addition, in a case where a user is notified of an urgent schedule, the output control unit 106 may cause the speed of the voice output by the terminal 20 to be faster than the standard.

(2-2-4-2. Change of Topic)

Moreover, the output control unit 106 is also capable of causing a topic corresponding to the voice output by the terminal 20 to be changed on the basis of a result of inference by the inference unit 104. For example, in a case where it has been inferred that the action purpose of the user is "happy family fireside" or "going out" (or, in a case where it has been recognized that the space in which the user is located is a "living room" or "the outdoors"), the output control unit 106 does not need to cause the terminal 20 to output a voice corresponding to privacy information, schedule or the like of the user. In addition, in a case where it has been inferred that the action purpose of the user is "happy family fireside" (or, in a case where it has been recognized that the space in which the user is located is a "living room"), the output control unit 106 may cause the terminal 20 to output a voice that proposes a candidate of a visiting destination, or a voice that proposes event information related to an event that allows the user to participate with family members from now. In particular, in a case where a time zone is in the evening or later, and a plurality of users are located in the "living room", the output control unit 106 may cause the terminal 20 to output a voice that proposes a candidate of a visiting destination of the plurality of users.

In addition, in a case where it has been inferred that the action purpose of the user is "study" (or, in a case where it has been recognized that the space in which the user is located is a "children's room"), the output control unit 106 does not need to cause the terminal 20 to output a voice corresponding to adult-oriented information (for example, economic news, etc.). Alternatively, in a case where it has been recognized that the space in which the user is located is a "private room (of the user)", the output control unit 106 may cause the terminal 20 to output a voice corresponding to privacy information, schedule or the like of the user.

(2-2-4-3. Change of Speaking Length)

Moreover, the output control unit 106 is also capable of causing a length of the voice for each voice output performed by the terminal 20 to be changed on the basis of the result of inference by the inference unit 104. For example, in a case where it has been inferred that the action purpose of the user is "happy family fireside" (or, in a case where it has been recognized that the space in which the user is located is a "living room"), the output control unit 106 may cause the length of the voice for each voice output performed by the terminal 20 to be longer than the standard.

(2-2-4-4. Change of Sensing Frequency)

Moreover, the output control unit 106 is also capable of causing a sensing frequency of sensing by (the sensor unit 222 of) the terminal 20 to be changed on the basis of the result of inference by the inference unit 104. In general, in a kitchen, a volume change and a variation in noises tend to be large. Accordingly, in a case where it has been inferred that the action purpose of the user is "cooking" (or, in a case where it has been recognized that the space in which the user is located is a "kitchen"), the output control unit 106 may cause the sensing frequency of sensing by the terminal 20 to be higher than the standard. In addition, in a case where it has been inferred that the action purpose of the user is "sleep" (or, in a case where it has been recognized that the space in which the user is located is a "bedroom"), the output control unit 106 may cause the sensing frequency of sensing by the terminal 20 to be lower than the standard.

2-2-5. Communication Unit 120

The communication unit 120 is an example of a receiving unit according to the present disclosure. The communication unit 120 can include the undermentioned communication device 162. The communication unit 120 transmits/receives information to/from other devices through, for example, the communication network 22. For example, the communication unit 120 receives a sensing result of sensing by the terminal 20 from the terminal 20. In addition, according to control of the output control unit 106, the communication unit 120 transmits, to the terminal 20, control information used to cause a voice to be output.

2-2-6. Storage Unit 122

The storage unit 122 can include the undermentioned storage device 160. The storage unit 122 stores various kinds of data and various kinds of software. For example, as illustrated in FIG. 3, the storage unit 122 stores the general object recognition information DB 124, the user identification information DB 126, the action pattern information DB 128, the sound source identification information DB 130, and a speaking classification information DB 132. It should be noted that the present invention is not limited to such an example. At least one of these databases may be stored in other devices that are capable of communicating with the server 10 as an alternative to being stored in the server 10.

2-3. Process Flow

The configuration of the first embodiment has been explained above. Next, an example of a process flow according to the first embodiment will be described with reference to FIG. 4.

Figure 4:
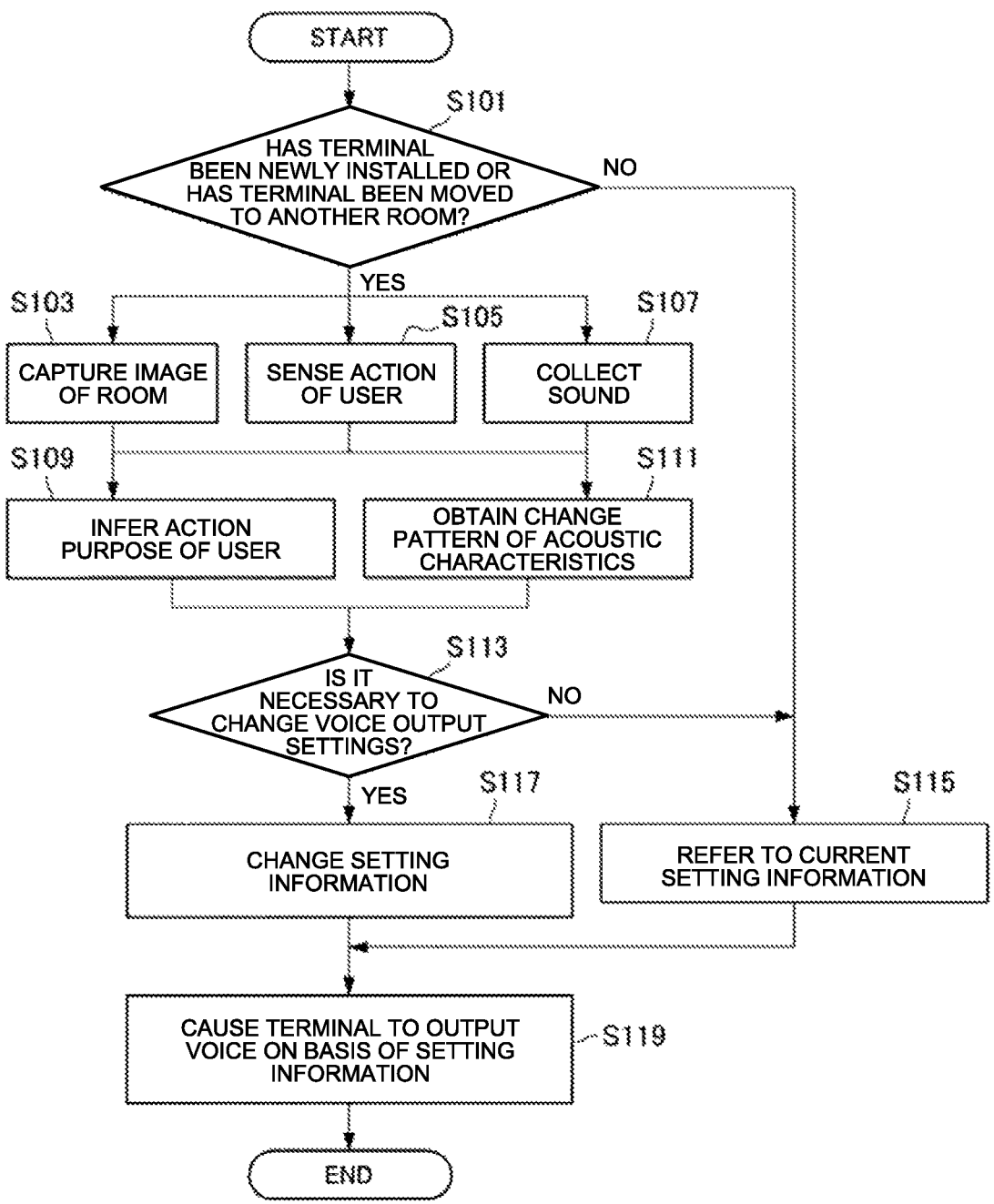
FIG. 4 is a flowchart illustrating a process flow according to the first embodiment.

As illustrated in FIG. 4, first of all, the control unit 200 of the terminal 20 determines whether or not the terminal 20 has been newly installed in a certain room, or whether or not the terminal 20 has been moved to another room (S101). In a case where it has been determined that the terminal 20 is continuously located in the same room (S101: No), processing of the undermentioned S115 is executed.

Meanwhile, in a case where it has been determined that the terminal 20 has been newly installed, or the terminal 20 has been moved to another room (S101: Yes), the sensor unit 222 of the terminal 20 captures an image of the room after the movement. Then, the communication unit 220 transmits the captured image to the server 10 according to the control of the transmission control unit 202 (S103).

Moreover, the sensor unit 222 senses an action of a user located in the room. Then, the communication unit 220 transmits a sensing result to the server 10 according to the control of the transmission control unit 202 (S105).

Moreover, the sensor unit 222 collects sound in the room. Then, the communication unit 220 transmits a sound collection result to the server 10 according to the control of the transmission control unit 202 (S107).

Subsequently, the recognition unit 102 of the server 10 subjects the sensing results received in S103, S105 and S107 to various recognition processing. Then, the inference unit 104 infers the action purpose of the user on the basis of results of the recognition processing (S109).

Moreover, the recognition unit 102 of the server 10 subjects the sensing results received in S103, S105 and S107 to various recognition processing, and thereby identifies a change pattern of acoustic characteristics in the room (S111).

Subsequently, the output control unit 106 determines whether or not it is necessary to change voice output settings on the basis of the inference result in S109, and the change pattern identified in S111 (S113). In a case where it has been determined that it is not necessary to change voice output settings (S113: No), with respect to voice output performed by the terminal 20, the output control unit 106 refers to information related to current output settings (S115). Subsequently, the output control unit 106 performs processing of the undermentioned S119.

Meanwhile, in a case where it has been determined that it is necessary to change voice output settings (S113: Yes), the output control unit 106 changes information related to voice output settings on the basis of the inference result in S109, and the change pattern obtained in S111 (S117).

Then, the output control unit 106 generates control information used to cause the terminal 20 to output a voice based on the information related to output settings referred to in S115, or based on information related to output settings after the change in S117. In addition, the communication unit 120 transmits the control information to the terminal 20 according to the control of the output control unit 106. Subsequently, the output control unit 204 of the terminal 20 causes the output unit 224 to output a voice according to the received control information (S119).

2-4. Effects

As described above, the server 10 according to the first embodiment infers an action purpose of a user on the basis of a result of sensing by the terminal 20, and then controls output of a voice to the user performed by the terminal 20 on the basis of the inference result. This enables to control the output of the voice so as to be adaptive to the user's action purpose.

For example, the server 10 is capable of appropriately changing acoustic characteristics of a voice output by the terminal 20 according to the inferred action purpose of the user. Therefore, even in a case where a place in which the terminal 20 is located has been changed, acoustic characteristics (volume, etc.) of a voice output by the terminal 20 can be automatically and appropriately changed. Therefore, it is not necessary to manually set acoustic characteristics of the voice again. For example, in a scene in which a notification is sent to a user, the server 10 is capable of immediately causing the terminal 20 to output a voice with appropriate acoustic characteristics.

In addition, even in a case where, for example, noises have occurred, user's movement has changed, or the like, acoustic characteristics of a voice output by the terminal 20 can be automatically and appropriately set (or changed).

2-5. Modified Examples

2-5-1. Modified Example 1

The first embodiment is not limited to the above-described example. As a modified example, in a case where noises have been sensed by the terminal 20, and in a case where it has been recognized that the noises are temporarily occurring, the output control unit 106 may cause output of a voice performed by the terminal 20 to be stopped until the noises stop.

2-5-2. Modified Example 2

As another modified example, the server 10 is also capable of controlling sensing of the terminal 20 according to accuracy of the sensing result received from the terminal 20. For example, in a case where it has been recognized that an obstacle or wall is located in an angle of view of the camera of the terminal 20, accuracy of sensing by the camera will decrease. Accordingly, in this case, the server 10 may control sensing of the terminal 20 in such a manner that a frequency of sensing by the microphone of the terminal 20 increases. Alternatively, in this case, among sensing results received from the terminal 20, the server 10 may increase a degree of use (or a degree of trust) of the sensed sound rather than the sensed image.

In general, in a case where the terminal 20 is arranged in a place where stationary noises or variations in noises are large, accuracy of sensing by the microphone of the terminal 20 will decrease. Accordingly, in this case, the server 10 may control sensing of the terminal 20 in such a manner that a frequency of sensing by the camera of the terminal 20 increases. Alternatively, in this case, among sensing results received from the terminal 20, the server 10 may increase a degree of use (or a degree of trust) of the sensed image rather than the sensed sound.

2-5-3. Modified Example 3

As another modified example, the output control unit 106 is also capable of controlling the output of the voice performed by the terminal 20 further on the basis of whether or not the action purpose of the user is business, and the number of users. For example, in a case where the action purpose of the user is "conference" (or, in a case where the space in which the user is located is a "conference room"), the output control unit 106 may cause the volume of the voice output by the terminal 20 to be higher than the standard, or may limit the topic corresponding to the voice to formal contents. It should be noted that the server 10 recognizes a size of the room, and the number of users who exist in the room, on the basis of, for example, analysis results of analyzing contents of speaking of individual users sensed by the terminal 20, and analysis results of analyzing images captured by the terminal 20, and thereby is capable of inferring whether or not the action purpose of the user is "conference".

3. Second Embodiment

The first embodiment has been explained above. Incidentally, atmosphere expected by a user (for example, a psychological state of the user, or the like) may differ depending on an action purpose of the user. In addition, a situation in which there is a difference between the atmosphere expected by the user and the current atmosphere of the user also often occurs.

Next, the second embodiment will be described. As described later, according to the second embodiment, an output mode of a voice output by the terminal 20 can be gradually changed so as to be adaptive to an action purpose of a user. As the result, an effect of guiding the user to a direction of the atmosphere expected by the user can be produced.

3-1. Configuration: Terminal 20

A configuration of the terminal 20 according to the second embodiment is similar to that in the first embodiment.

3-2. Configuration: Server 10

Figure 5:
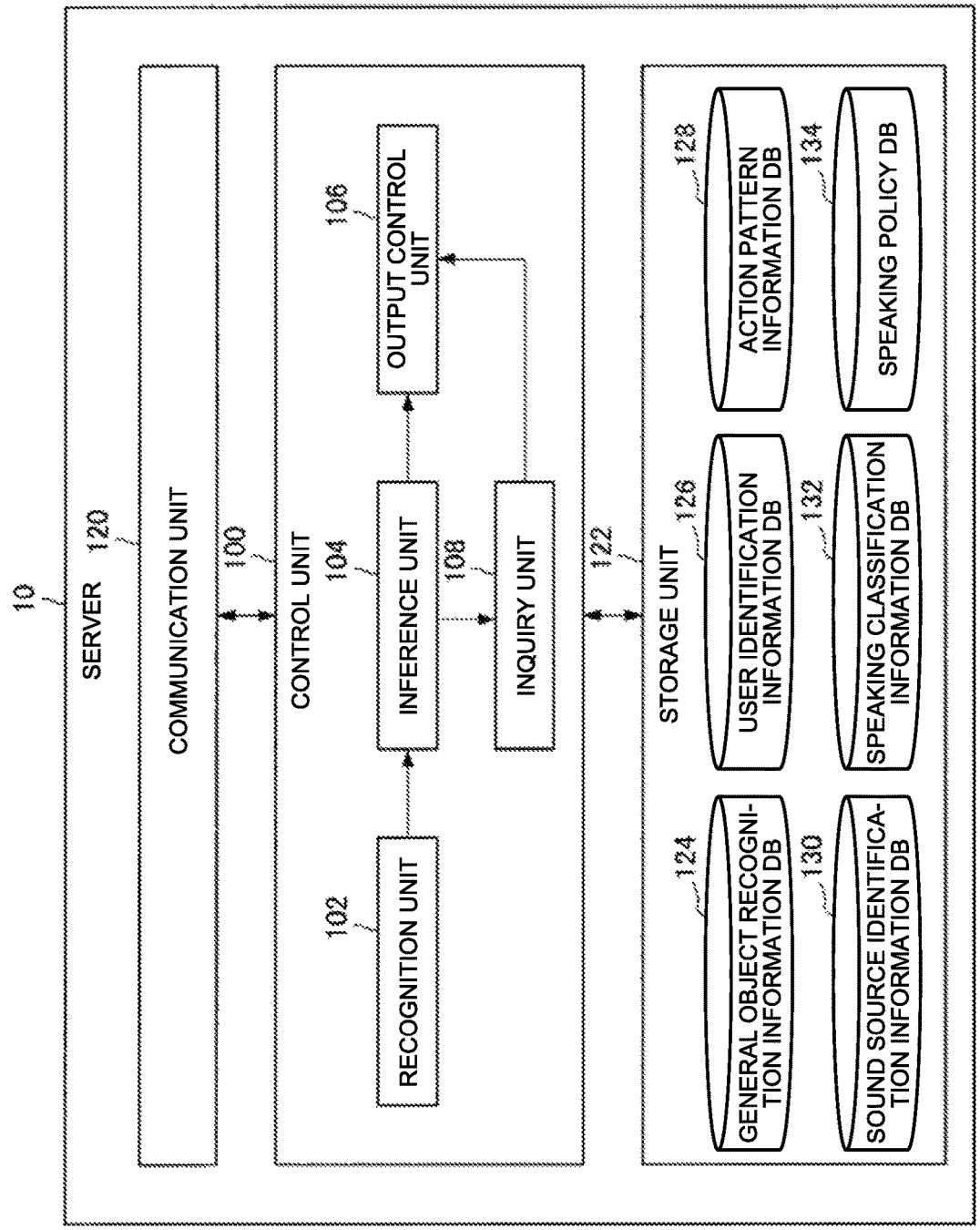
FIG. 5 is a functional block diagram illustrating a configuration example of the server 10 according to a second embodiment.

FIG. 5 is a functional block diagram illustrating a configuration example of the server 10 according to the second embodiment. As illustrated in FIG. 5, in comparison with the first embodiment, the server 10 according to the second embodiment is further provided with an inquiry unit 108. Only components each having a different function in comparison with the first embodiment will be described below.

3-2-1. Inquiry Unit 108

In a case where an action purpose of a user cannot be sufficiently inferred by the inference unit 104, the inquiry unit 108 causes the terminal 20 to output a voice for inquiring of the user about an action purpose of the user. For example, in a case where reliability of the action purpose of the user inferred by the inference unit 104 is lower than a predetermined threshold value, the inquiry unit 108 causes the terminal 20 to output a voice for inquiring of the user about the action purpose of the user.

3-2-2. Output Control Unit 106

(3-2-2-1. Example of Changing Acoustic Characteristics)

Every time a voice is output by the terminal 20, the output control unit 106 according to the second embodiment causes an output mode of a voice output to the user by the terminal 20 to be gradually changed on the basis of a mode of target speaking corresponding to the action purpose of the user inferred by the inference unit 104. For example, the output control unit 106 causes the output mode of the voice output by the terminal 20 to be gradually changed on the basis of a comparison between a mode of speaking of the user, the mode being identified by a sound collection result of speaking of the user received from the terminal 20, and a mode of target speaking corresponding to the action purpose of the user. As an example, the output control unit 106 controls the terminal 20 in such a manner that acoustic characteristics (for example, pitch, volume and speed, etc.) of the voice output by the terminal 20 gradually change from acoustic characteristics of first speaking of the user, which have been identified by a sound collection result of speaking of the user received from the terminal 20, to target acoustic characteristics corresponding to the action purpose of the user. It should be noted that data indicating correspondence relationship between the action purpose of the user and the mode of target speaking can be stored in a speaking policy DB 134. As illustrated in, for example, FIG. 5, the speaking policy DB 134 can be stored in the storage unit 122.

For example, first of all, the output control unit 106 identifies acoustic characteristics of speaking of the user on the basis of a sound collection result of speaking of the user (for example, speaking of the user to the terminal 20, speaking between users, etc.), which has been first received from the terminal 20. Next, the output control unit 106 sets the identified acoustic characteristics of speaking of the user as acoustic characteristics of the voice that is first output by the terminal 20. Then, the output control unit 106 controls voice output by the terminal 20 in such a manner that the acoustic characteristics of the voice output by the terminal 20 are changed from the acoustic characteristics of speaking of the user to target acoustic characteristics corresponding to the action purpose of the user (inferred by the inference unit 104).

Figure 6:
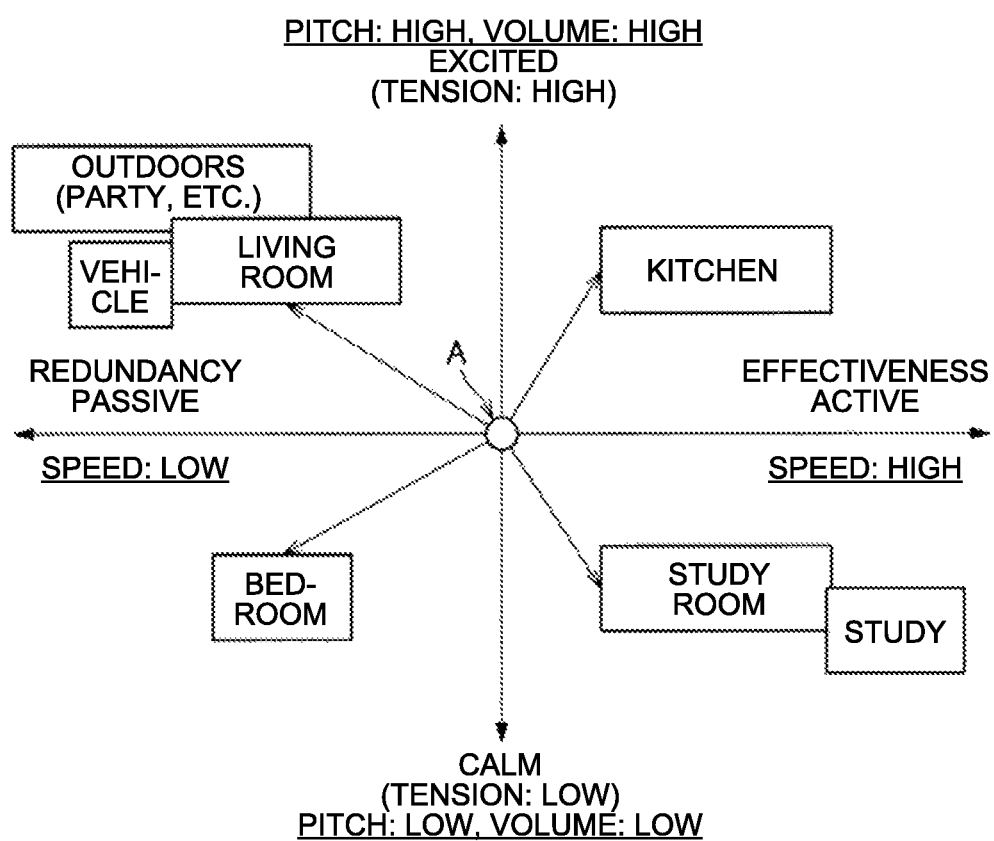
FIG. 6 is a drawing illustrating an example of correspondence relationship between use of a room and a mode of speaking of a target.

Here, the above-described function will be described in more detail with reference to FIG. 6. FIG. 6 is a drawing illustrating an example of correspondence relationship between use of a room and a mode of target speaking applied in a case where a user is located in the room. The example illustrated in FIG. 6 is based on the assumption that a mode of first speaking of the user is a mode corresponding to a point "A" illustrated in FIG. 6 (in other words, pitch, volume and speed values are all "moderate").

As illustrated in FIG. 6, in a case where the space in which the user is located is a "bedroom", the output control unit 106 may cause all of the volume, pitch and speed of the voice output by the terminal 20 to be gradually decreased every time the voice is output by the terminal 20. Consequently, atmosphere that enables the user to easily get relaxed can be realized. In addition, as illustrated in FIG. 6, in a case where the space in which the user is located is a "study room", the output control unit 106 may cause the speed of the voice output by the terminal 20 to be gradually increased, and at the same time, may cause the pitch of the voice to be gradually decreased, every time the voice is output by the terminal 20. Consequently, atmosphere in which study progresses quietly can be realized. In addition, as illustrated in FIG. 6, in a case where the space in which the user is located is a "living room", the output control unit 106 may cause the pitch of the voice output by the terminal 20 to be gradually increased, and at the same time, may cause the speed of the voice to be gradually decreased, every time the voice is output by the terminal 20. Consequently, atmosphere in which the user can enjoy talking can be realized. Further, as illustrated in FIG. 6, in a case where a plurality of users are located in "the outdoors", the output control unit 106 may set upper limit values (change range) of the pitch and speed of the voice output by the terminal 20 to be higher than, for example, those for the "living room". This enables to achieve exaggerated expressions.

In general, when a person is talking with a partner, the person tends to tune a mode of his/her own speaking to a mode of speaking of the partner. According to the above-described control example, the mode of the voice output by the terminal 20 is gradually changed to the mode of target speaking corresponding to the action purpose of the user. Therefore, it can be expected that the mode of speaking of the user who is talking with, for example, the terminal 20 also gradually changes to the mode of the target speaking in tune with the voice output performed by the terminal 20. As the result, it can be expected that atmosphere corresponding to the action purpose of the user, in other words, atmosphere expected by the user, is realized.

(3-2-2-2. Example of Changing Other Parameters)

Moreover, with respect to other kinds of parameters other than the acoustic characteristics (for example, an output frequency of the voice, a length of the voice, and a topic corresponding to the voice, etc.) related to the voice output by the terminal 20 as well, the output control unit 106 is also capable of causing such parameters to be changed according to the action purpose of the user inferred by the inference unit 104. For example, the output control unit 106 may cause the output frequency of the voice output by the terminal 20 to be gradually changed from the frequency of first speaking of the user, which has been identified by the sound collection result of speaking of the user received from the terminal 20, to the frequency of target speaking corresponding to the action purpose of the user. Alternatively, the output control unit 106 may cause the length of the voice for each voice output performed by the terminal 20 to be gradually changed from the length of the first speaking of the user, which has been identified by the sound collection result of speaking of the user received from the terminal 20, to the length of target speaking corresponding to the action purpose of the user.

Alternatively, the output control unit 106 may cause a topic corresponding to the voice output by the terminal 20 to be gradually changed from a first topic of the user, which has been identified by the sound collection result of speaking of the user received from the terminal 20, to a target topic corresponding to the action purpose of the user. It should be noted that in a case where a difference between the first topic and the target topic of the user is large, the output control unit 106 may cause the number of times the voice is output by the terminal 20 in a process of changing the topic to be larger than the initial number of times. Consequently, the topic can be gently (naturally) changed, which enables to avoid giving an unnatural impression to the user.

(3-2-2-3. Modified Example 1: Adjustment of Change Amount for Each Output)

As a modified example, the output control unit 106 is also capable of dynamically adjusting the change amount per one time of the output mode of the voice output by the terminal 20. For example, the output control unit 106 may adjust the change amount per one time of the output mode of the voice output by the terminal 20 according to the frequency of speaking of the user, which has been identified by the sound collection result of speaking of the user received from the terminal 20. As an example, with the increase in frequency of speaking of the user, the output control unit 106 may cause the change amount per one time of the output mode of the voice output by the terminal 20 to be smaller.

Alternatively, the output control unit 106 may adjust the change amount per one time of the output mode of the voice output by the terminal 20 according to the length of speaking of the user, which has been identified by the sound collection result of speaking of the user received from the terminal 20. For example, with the increase in length of speaking of the user, the output control unit 106 may cause the change amount per one time of the output mode of the voice output by the terminal 20 to be smaller.

(3-2-2-4. Modified example 2: Output control according to state of space)

As another modified example, the output control unit 106 is also capable of adjusting (final) change amount of the output mode of the voice output by the terminal 20 according to a state of a space (a room, etc.) in which a user is located. For example, the output control unit 106 may adjust the (final) change amount of the output mode of the voice output by the terminal 20 according to a noise level in the space in which the user is located. As an example, with the increase in noise level of noises sensed in the space, the output control unit 106 may set the final target volume at a value larger than the initial target volume. This enables to prevent the user from having difficulty in hearing the voice output by the terminal 20.

Alternatively, the output control unit 106 may adjust the (final) change amount in the output mode of the voice output by the terminal 20 according to brightness in the space in which the user is located. For example, the darker the inside of the space is, the output control unit 106 may further decrease the target volume of the voice output by the terminal 20.

(3-2-2-5. Modified Example 3: Output Control According to Change in Speaking of User)

As another modified example, the output control unit 106 is also capable of controlling the output of the voice performed by the terminal 20 further on the basis of a change degree to which the mode of speaking of the user has changed for each voice output to the user by the terminal 20. For example, every time a voice is output to the user once by the terminal 20, the server 10 identifies a change in the mode of speaking of the user after the output, and then is capable of recording the result of the identification. In this case, after the voice is output to the user a plurality of times by the terminal 20, by referring to the recorded information, the output control unit 106 may identify more effective voice output method used to change the mode of speaking of the user to the target speaking mode. In addition, the output control unit 106 may employ the identified output method by priority thereafter.

3-3. Process Flow

The configuration of the second embodiment has been explained above. Next, an example of a process flow according to the second embodiment will be described with reference to FIGS. 7 and 8.

Figure 7:
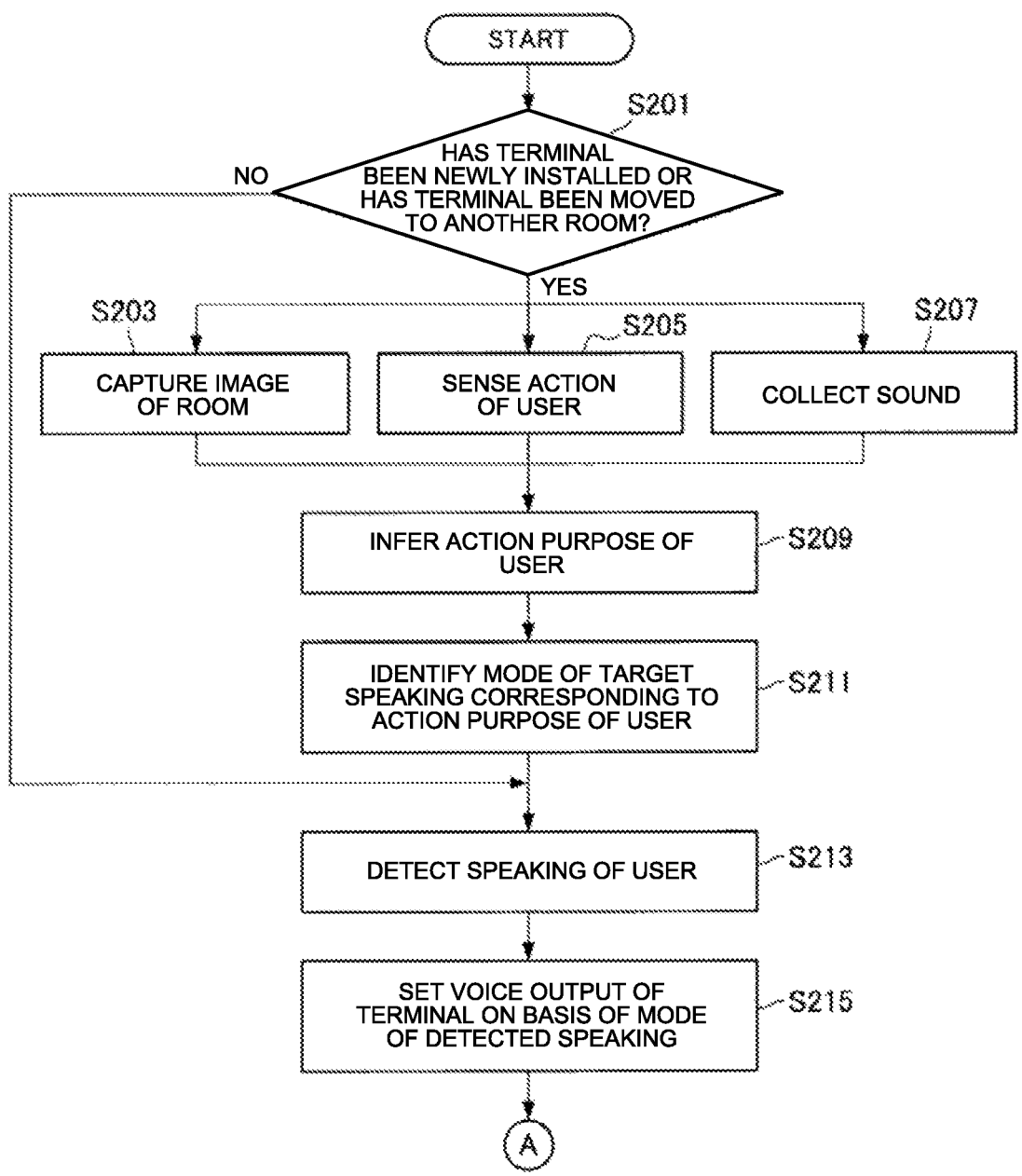
FIG. 7 is a flowchart illustrating a part of a process flow according to the second embodiment.

As illustrated in FIG. 7, first of all, the control unit 200 of the terminal 20 determines whether or not the terminal 20 has been newly installed in a certain room, or whether or not the terminal 20 has been moved to another room (S201). In a case where it has been determined that the terminal 20 is continuously located in the same room (S201: No), processing of the undermentioned S213 is executed.

Meanwhile, in a case where it has been determined that the terminal 20 has been newly installed, or the terminal 20 has been moved to another room (S201: Yes), first of all, processing that is similar to the processing in S103 to S109 in the first embodiment is executed (S203 to S209).

After S209, the output control unit 106 of the server 10 identifies a mode of target speaking corresponding to an action purpose of a user inferred in S209 by referring to the speaking policy DB 134 (S211).

Subsequently, the recognition unit 102 detects speaking of the user on the basis of a sound collection result in S207 (S213).

Subsequently, the output control unit 106 identifies a mode of speaking of the user on the basis of speaking detected in S213. In addition, the output control unit 106 sets an output mode of the voice output by the terminal 20 in such a manner that the output mode of the voice agrees with, or approximates to, the identified speaking mode (S215).

Figure 8:
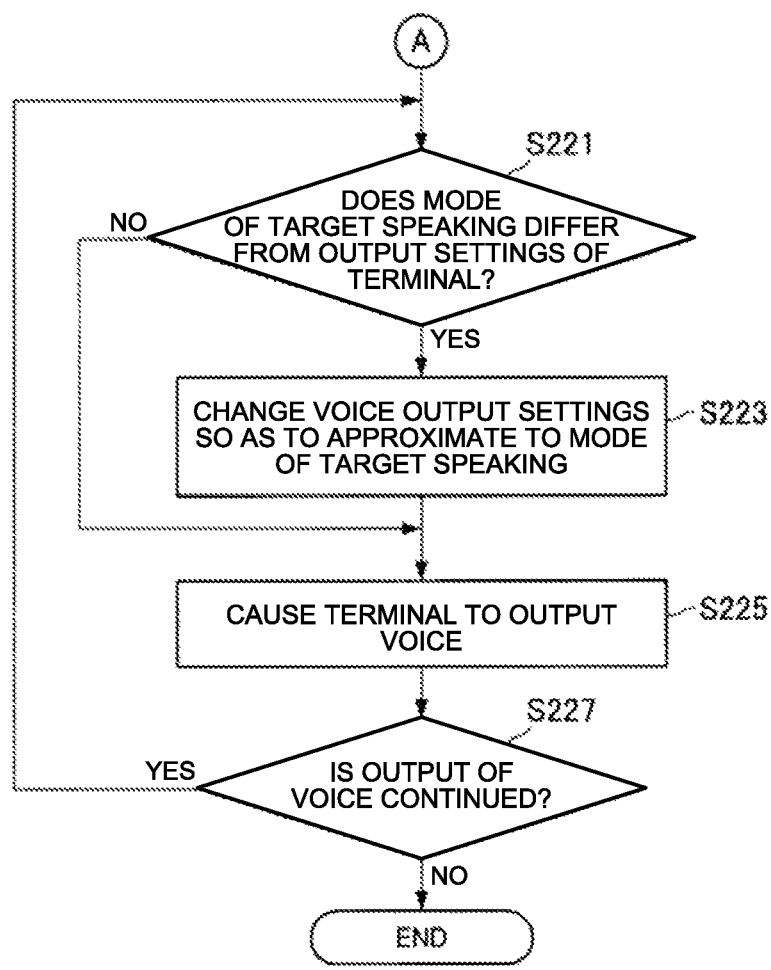
FIG. 8 is a flowchart illustrating a part of a process flow according to the second embodiment.

Here, a process flow after S215 will be described with reference to FIG. 8. As illustrated in FIG. 8, after S215, the output control unit 106 determines whether or not there is a difference between the mode of target speaking identified in S211 and the output mode of the current voice by the terminal 20 (S221). In a case where it has been determined that there is no difference therebetween (S221: No), the server 10 performs processing of the undermentioned S225.

Meanwhile, in a case where it has been determined that there is a difference therebetween (S221: Yes), the output control unit 106 changes settings of the output mode of the voice output by the terminal 20 in such a manner that the difference between the mode of target speaking and the output mode of the voice output by the terminal 20 decreases to a certain extent (S223).

Subsequently, the output control unit 106 generates control information used to cause the terminal 20 to output a voice according to the output mode that has been change in S223. In addition, the communication unit 120 transmits the control information to the terminal 20 according to the control of the output control unit 106. Subsequently, the output control unit 204 of the terminal 20 causes the output unit 224 to output a voice according to the received control information (S225).

Subsequently, in a case where the output of the voice by the terminal 20 is continued (S227: Yes), the processing of S221 and after is repeated again. Meanwhile, in a case where the output of the voice by the terminal 20 is not continued (S227: No), the process flow ends.

3-4. Effects

As described above, the server 10 according to the second embodiment infers an action purpose of a user on the basis of a sensing result of sensing by the sensor unit 222 of the terminal 20, and then on the basis of a mode of target speaking corresponding to the inferred action purpose of the user, the server 10 causes an output mode of a voice output to the user by the terminal 20 to be gradually changed every time the voice is output by the terminal 20. Consequently, the output mode of the voice output by the terminal 20 can be gradually changed so as to be adaptive to the action purpose of the user. As the result, the user can be guided to a direction of atmosphere expected by the user. For example, user's repeated talking with the terminal 20 enables to realize the atmosphere expected by the user.

3-5. Modified Examples 3-5-1. Modified Example 1: Output Control According to Change in Action Purpose of User The second embodiment is not limited to the above-described example. It can also be considered that the server 10 recognizes that, for example, the action purpose of the user has changed, or the inference result of inferring the action purpose of the user was wrong. Accordingly, as a modified example, the server 10 (the inference unit 104) is capable of identifying an action purpose of the user after the change, or a true action purpose of the user, on the basis of a sensing result newly received from the terminal 20. Then, the output control unit 106 may cause the output mode of the voice output by the terminal 20 to be changed on the basis of a mode of target speaking corresponding to the newly identified action purpose of the user.

Alternatively, in a case where it is difficult for the server 10 (the inference unit 104) to identify "the action purpose of the user after the change, or the true action purpose of the user", the inquiry unit 108 may inquire of the user about the action purpose of the user through the terminal 20. Then, in a case where an answer for the inquiry could have been obtained from the user, first of all, the output control unit 106 is capable of identifying a mode of target speaking corresponding to the answer. In addition, the output control unit 106 may cause the output mode of the voice output to the user by the terminal 20 to be gradually changed on the basis of the identified mode of target speaking.

Alternatively, in this case, the output control unit 106 may cause the terminal 20 to output a predetermined sound in a mode identical to, or approximate to, the mode of target speaking corresponding to "the action purpose of the user after the change, or the true action purpose of the user", which has been temporarily inferred by the inference unit 104. Next, the server 10 may recognize a reaction of the user to the sound on the basis of a new sensing result by the terminal 20. In addition, in a case where it has been determined, on the basis of the recognition result, that the "temporarily inferred action purpose of the user" is correct, the server 10 may cause the output mode of the voice output by the terminal 20 to be gradually changed on the basis of the mode of target speaking corresponding to this action purpose.

3-5-2. Modified Example 2: Adjustment of Output Frequency of Voice by Terminal 20

In general, for example, in a case where a user is talking with the terminal 20, in a case where a frequency of speaking of the user largely differs from an output frequency of a voice output by the terminal 20, the user may have an unnatural impression. Accordingly, as another modified example, the output control unit 106 may identify the frequency of speaking of the user on the basis of a sound collection result of collecting speaking of the user received from the terminal 20, and then may cause the output frequency of the voice output by the terminal 20 to agree with, or approximate to, the identified frequency of speaking.

Alternatively, the frequency of speaking of the user may be recorded on a room basis (or, on a user's action purpose basis). In this case, the output control unit 106 may identify the frequency of speaking suitable for the room in which the user is located (or the action purpose of the user) by referring to the recorded information, and then may cause the output frequency of the voice output by the terminal 20 to agree with, or approximate to, the identified frequency.

3-5-3. Modified Example 3: Adjustment of Length of Voice by Terminal 20

Similarly, in a case where the length of speaking of a user largely differs from the length of the voice output by the terminal 20, the user may have an unnatural impression. Accordingly, as another modified example, the output control unit 106 may identify the length of speaking of the user on the basis of a sound collection result of collecting speaking of the user received from the terminal 20, and then may cause the length of the voice output by the terminal 20 to agree with, or approximate to, the identified length of speaking.

Alternatively, the length of speaking of the user may be recorded on a room basis (or, on a user's action purpose basis). In this case, the output control unit 106 may identify the length of speaking suitable for the room in which the user is located (or the action purpose of the user) by referring to the recorded information, and then may cause the length of the voice output by the terminal 20 to agree with, or approximate to, the identified length.

4. Hardware Configuration

Next, a hardware configuration example of the server 10 shared by each embodiment will be described with reference to FIG. 9. As illustrated in FIG. 9, the server 10 is provided with the CPU 150, a Read Only Memory (ROM) 152, a Random Access Memory (RAM) 154, a bus 156, an interface 158, the storage device 160, and the communication device 162.

The CPU 150 functions as a computation processing device and a control device, and controls the overall operation in the server 10 according to various kinds of programs. In addition, the CPU 150 realizes a function of the control unit 100 in the server 10. It should be noted that the CPU 150 is formed by a processor such as a microprocessor.

The ROM 152 stores, for example, programs used by the CPU 150, and control data such as computation parameters.

The RAM 154 temporarily stores, for example, programs executed by the CPU 150, data that is being used, and the like.

The bus 156 is formed by a CPU bus and the like. This bus 156 mutually connects the CPU 150, the ROM 152 and the RAM 154.

The interface 158 connects the storage device 160 and the communication device 162 to the bus 156.

The storage device 160 is a data storing device that functions as the storage unit 122. The storage device 160 includes, for example, a storage medium, a recording device for recording data on the storage medium, a readout device for reading data from the storage medium, a deletion device for deleting data recorded on the storage medium, or the like.

The communication device 162 is a communication interface that is used for connecting to, for example, the communication network 22 or the like, and is formed by a communication device (for example, a network card, etc.) or the like. In addition, the communication device 162 may be a wireless LAN supported communication device, a Long Term Evolution (LTE) supported communication device, or a wired communication device that performs wired communication.

This communication device 162 functions as the communication unit 120.

5. Modified Examples

The preferable embodiments of the present disclosure have been described in detail as above with reference to the accompanying drawings. However, the present disclosure is not limited to the above-described examples. It is clear that persons who have ordinary skill in the technical field to which the present disclosure belongs can conceive of various correction examples or modification examples within the category of the technical idea set forth in the claims. It should be understood that, as a matter of course, these examples also belong to the technical range of the present disclosure.

5-1. Modified Example 1

For example, each embodiment described above shows an example in which the output control unit 106 of the server 10 controls the output of a voice to a user performed by the terminal 20 on the basis of an inference result of inferring an action purpose of the user. However, the present invention is not limited to such an example. For example, the server 10 transmits the inference result of inferring the action purpose of the user to the terminal 20, and subsequently the output control unit 204 of the terminal 20 may control the output of the voice to the user performed by the output unit 224 on the basis of the received inference result. In other words, the output control unit 204 of the terminal 20 may cause the acoustic characteristics of the voice output by the output unit 224 to be changed on the basis of the received inference result of inferring the action purpose of the user. In this modified example, the output control unit 204 of the terminal 20 may further include substantially all functions of the output control unit 106 according to each embodiment described above.

5-2. Modified Example 2

As another modified example, although FIG. 1 illustrates only one server 10, the present invention is not limited to such an example. The functions of the server 10 according to each embodiment may be realized by causing a plurality of computers to operate in cooperation.

5-3. Modified Example 3

As another modified example, the information processing device according to the present disclosure is not limited to the server 10. The information processing device may be other kinds of devices having the functions of the control unit 100 according to each embodiment. For example, the information processing device may be a general-purpose Personal Computer (PC), a tablet-type terminal, a game machine, a portable telephone such as a smart phone, a portable music player, a speaker, a projector, a wearable device (for example, a Head Mounted Display (HMD), a smart watch, etc.), a vehicle-mounted device (a car navigation device, etc.), or a robot (for example, a humanoid-type robot, a drone, etc.).

5-4. Modified Example 4

As another modified example, the server 10 and the terminal 20 may be configured as an integrated device as an alternative to being configured as separate devices. For example, the control unit 200 of the terminal 20 may be configured to include all of components included in the control unit 100 of the server 10 according to each embodiment described above, and at the same time, the server 10 may be excluded. In this case, the information processing device according to the present disclosure can be the terminal 20.

5-5. Modified Example 5

In addition, each step in the process flow in each embodiment described above is not always required to be executed according to the above-described order. For example, each step may be executed with the order changed as appropriate. In addition, each step may be executed partially in a parallel or individual manner as an alternative to being executed in a time-series manner. Moreover, a part of the above-described steps may be omitted, or another step may be added to the above-described steps.

In addition, according to each embodiment described above, a computer program that causes hardware such as the CPU 150, the ROM 152, and the RAM 154 to serve a function equivalent to that of each configuration of the server 10 according to each embodiment can also be provided. Further, a storage medium having the computer program recorded thereon is also provided.

Furthermore, the effects described in the present description are to be construed as merely descriptive or illustrative, and are not limitative. In other words, the technology according to the present disclosure can achieve, along with or instead of the above effects, other effects apparent to a person skilled in the art from the statement of the present description.

It should be noted that the following configurations also belong to the technical scope of the present disclosure.

(1)

An information processing device comprising:

an inference unit that infers an action purpose of a user on the basis of a result of sensing by one or more sensors; and an output control unit that controls, on the basis of a result of inference by the inference unit, output of a voice to the user performed by an audio output unit.

(2)

The information processing device according to (1), wherein the output control unit causes acoustic characteristics of the voice output by the audio output unit to be changed on the basis of the result of inference by the inference unit.

(3)

The information processing device according to (2), wherein at least one of the one or more sensors senses sound occurring in a place where the user is located, and the output control unit causes the acoustic characteristics of the voice output by the audio output unit to be changed further on the basis of a sensing result of sensing the sound in the place where the user is located.

(4)

The information processing device according to (2) or (3), wherein the output control unit causes the acoustic characteristics of the voice output by the audio output unit to be changed further according to a topic corresponding to the voice output to the user.

(5)

The information processing device according to any one of (2) to (4), wherein the output control unit controls the output of the voice to the user performed by the audio output unit further on the basis of whether or not an action purpose of the user is business, and the number of the users.

(6)

The information processing device according to any one of (2) to (5), wherein the output control unit causes a frequency of sensing by at least one of the one or more sensors to be further changed on the basis of the result of inference by the inference unit.

(7)

The information processing device according to any one of (2) to (6), wherein the output control unit causes a topic corresponding to the voice output by the audio output unit to be further changed on the basis of the result of inference by the inference unit.

(8)

The information processing device according to any one of (2) to (7), wherein the output control unit causes a length of the voice for each voice output to the user to be further changed on the basis of the result of inference by the inference unit.

(9)

The information processing device according to any one of (1) to (8), wherein the output control unit causes an output mode of the voice output to the user by the audio output unit to be gradually changed for each voice output by the audio output unit on the basis of a mode of target speaking corresponding to the action purpose of the user inferred by the inference unit.

(10)

The information processing device according to (9), further comprising a receiving unit that receives a sound collection result of collecting speaking of the user, wherein the output control unit causes the output mode of the voice output by the audio output unit to be gradually changed on the basis of a comparison between a mode of speaking of the user identified by the sound collection result of collecting speaking of the user, and a mode of target speaking corresponding to the action purpose of the user.

(11)

The information processing device according to (10), wherein the output control unit causes the output mode of the voice output by the audio output unit to be gradually changed in such a manner that the output mode of the voice output by the audio output unit changes from the mode of speaking of the user identified by the sound collection result of collecting speaking of the user to the mode of target speaking corresponding to the action purpose of the user.

(12)

The information processing device according to (11), wherein the output control unit causes the acoustic characteristics of the voice output by the audio output unit to be gradually changed in such a manner that the acoustic characteristics of the voice output by the audio output unit changes from the acoustic characteristics of speaking of the user identified by the sound collection result of collecting speaking of the user to target acoustic characteristics corresponding to the action purpose of the user.

(13)

The information processing device according to (11) or (12), wherein the inference unit successively infers an action purpose of the user every time a sensing result of sensing by the one or more sensors is obtained, and in a case where a second action purpose that differs from a first action purpose of the user initially inferred by the inference unit is inferred by the inference unit, the output control unit causes the output mode of the voice output by the audio output unit to be gradually changed on the basis of a mode of target speaking corresponding to the second action purpose.

(14)

The information processing device according to any one of (11) to (13), wherein every time a voice is output by the audio output unit, a change in mode of speaking of the user is identified, and the output control unit causes the output mode of the voice output to the user by the audio output unit to be gradually changed further on the basis of a change degree to which the mode of speaking of the user has changed for each voice output to the user.

(15)

The information processing device according to any one of (11) to (14), further comprising an inquiry unit that, in a case where reliability of the action purpose of the user inferred by the inference unit is lower than a predetermined threshold value, inquires of the user about the action purpose of the user, wherein the output control unit causes the output mode of the voice output to the user by the audio output unit to be gradually changed on the basis of a mode of target speaking corresponding to an answer of the user to the inquiry by the inquiry unit.

(16)

The information processing device according to any one of (11) to (15), further comprising
a recognition unit that recognizes an action of the user on the basis of a sensing result of sensing by the one or more sensors, wherein
the inference unit infers an action purpose of the user on the basis of a result of recognition by the recognition unit.

(17)

The information processing device according to (16), wherein
the inference unit infers an action purpose of the user further on the basis of use corresponding to a room in which the user is located, the use being identified on the basis of the result of sensing by the one or more sensors.

(18)

An information processing terminal comprising:
a receiving unit that receives an inference result of inferring an action purpose of a user, the action purpose of the user having been inferred on the basis of a result of sensing by one or more sensors; and
an output control unit that controls output of a voice to the user on the basis of the received inference result of inferring the action purpose of the user.

(19)

An information processing method comprising:
inferring an action purpose of a user on the basis of a result of sensing by one or more sensors; and
on the basis of a result of the inference, controlling output of a voice to the user performed by an audio output unit.

(20)

A program causing a computer to function as:
an inference unit that infers an action purpose of a user on the basis of a result of sensing by one or more sensors; and
an output control unit that controls, on the basis of a result of inference by the inference unit, output of a voice to the user performed by an audio output unit.

Reference Signs List

10 SERVER
20 TERMINAL
22 COMMUNICATION NETWORK
100, 200 CONTROL UNIT
102 RECOGNITION UNIT
104 INFERENCE UNIT
106, 204 OUTPUT CONTROL UNIT
108 INQUIRY UNIT
120, 220 COMMUNICATION UNIT
122 STORAGE UNIT
124 GENERAL OBJECT RECOGNITION INFORMATION DB
126 USER IDENTIFICATION INFORMATION DB
128 ACTION PATTERN INFORMATION DB
130 SOUND SOURCE IDENTIFICATION INFORMATION DB
132 SPEAKING CLASSIFICATION INFORMATION DB
134 SPEAKING POLICY DB
202 TRANSMISSION CONTROL UNIT
222 SENSOR UNIT
224 OUTPUT UNIT
226 STORAGE UNIT

The invention claimed is:

1. An information processing device comprising: a memory; and processing circuitry configured to infer an action purpose of a user based on a result of sensing by one or more sensors, the action purpose being inferred using at least information of a room in which the user is located, and control, based on the inferred action purpose, output of a voice to the user by an audio output unit, wherein the memory stores a plurality of target modes of speaking according to the action purpose of the user, each of the plurality of target modes of speaking corresponding to each room in which the user may be located, each of the plurality of target modes of speaking defining at least one of a combination of volume, pitch and speed of the voice output by the audio output unit, such that each room has a corresponding combination of volume, pitch and speed of the voice output by the audio output unit, and the processing circuitry is further configured to identify, from among the plurality of target modes of speaking stored in the memory, based on the information of the room in which the user is located, a first target mode of speaking that corresponds to the inferred action purpose of the user, the first target mode of speaking defining a first combination of first volume, first pitch and first speed of the voice output by the audio output unit, receive a sound collection result of collecting speaking of the user, identify a mode of speaking of the user based on the received sound collection result, the identified mode of speaking of the user defining a second combination of second volume, second pitch and second speed, and control the output of the voice such that at least one of the combination of volume, pitch and speed of the voice output to the user by the audio output unit is gradually changed from (1) the second combination of the second volume, the second pitch and the second speed of the identified mode of speaking of the user identified based on the received sound collection result to (2) the first combination of the first volume, the first pitch and the first speed of the identified first target mode of speaking identified based on the information of the room in which the user is located.

2. The information processing device according to claim 1, wherein
at least one of the one or more sensors senses sound occurring in a place where the user is located, and
the processing circuitry causes acoustic characteristics of the voice output by the audio output unit to be changed further on the basis of a sensing result of sensing the sound in the place where the user is located.

3. The information processing device according to claim 1, wherein
the processing circuitry causes acoustic characteristics of the voice output by the audio output unit to be changed further according to a topic corresponding to the voice output to the user.

4. The information processing device according to claim 1, wherein
the processing circuitry controls the output of the voice to the user by the audio output unit further on the basis of whether or not the action purpose of the user is business, and the number of the users.

5. The information processing device according to claim 1, wherein
the processing circuitry causes a frequency of sensing by at least one of the one or more sensors to be further changed on the basis of the result of inference by the processing circuitry.

6. The information processing device according to claim 1, wherein
the processing circuitry causes a topic corresponding to the voice output by the audio output unit to be further changed on the basis of the result of inference by the processing circuitry.

7. The information processing device according to claim 1, wherein
the processing circuitry causes a length of the voice for each voice output to the user to be further changed on the basis of the result of inference by the processing circuitry.

8. The information processing device according to claim 1, wherein
the processing circuitry successively infers the action purpose of the user every time a sensing result of sensing by the one or more sensors is obtained, and
in a case where a second action purpose that differs from a first action purpose of the user initially inferred by the processing circuitry is inferred by the processing circuitry, the processing circuitry causes the output mode of the voice output by the audio output unit to be gradually changed on the basis of a mode of target speaking corresponding to the second action purpose.

9. The information processing device according to claim 1, wherein
every time a voice is output by the audio output unit, a change in mode of speaking of the user is identified, and
the processing circuitry causes the output mode of the voice output to the user by the audio output unit to be gradually changed further on the basis of a change degree to which the mode of speaking of the user has changed for each voice output to the user.

10. The information processing device according to claim 1, wherein
in a case where reliability of the action purpose of the user inferred by the processing circuitry is lower than a predetermined threshold value, the processing circuitry inquires of the user about the action purpose of the user, and
the processing circuitry causes the output mode of the voice output to the user by the audio output unit to be gradually changed on the basis of a mode of target speaking corresponding to an answer of the user to the inquiry by the processing circuitry.

11. The information processing device according to claim 1, wherein
the processing circuitry recognizes an action of the user on the basis of a sensing result of sensing by the one or more sensors, and
the processing circuitry infers the action purpose of the user on the basis of a result of recognition by the processing circuitry.

12. An information processing method comprising: inferring, using processing circuitry, an action purpose of a user based on a result of sensing by one or more sensors, the action purpose being inferred using at least information of a room in which the user is located; and controlling, using the processing circuitry, based on the inferred action purpose, output of a voice to the user by an audio output unit, wherein a plurality of target modes of speaking according to the action purpose of the user are stored in a memory, each of the plurality of target modes of speaking corresponding to each room in which the user may be located, each of the plurality of target modes of speaking defining at least a combination of volume, pitch and speed of the voice output by the audio output unit, such that each room has a corresponding combination of volume, pitch and speed of the voice output by the audio output unit, and the information processing method further comprises identifying, from among the plurality of target modes of speaking stored in the memory, based on the information of the room in which the user is located, a first target mode of speaking that corresponds to the inferred action purpose of the user, the first target mode of speaking defining a first combination of first volume, first pitch and first speed of the voice output by the audio output unit, receiving a sound collection result of collecting speaking of the user, identifying a mode of speaking of the user based on the received sound collection result, the identified mode of speaking of the user defining a second combination of second volume, second pitch and second speed, and controlling the output of the voice such that the combination of volume, pitch and speed of the voice output to the user by the audio output unit is gradually changed from (1) the second combination of the second volume, the second pitch and the second speed of the identified mode of speaking of the user identified based on the received sound collection result to (2) the first combination of the first volume, the first pitch and the first speed of the identified first target mode of speaking identified based on the information of the room in which the user is located.

13. A non-transitory computer readable medium including executable instructions, which when executed by a computer cause the computer to execute an information processing method, the method comprising: inferring an action purpose of a user based on a result of sensing by one or more sensors, the action purpose being inferred using at least information of a room in which the user is located; and controlling, based on the inferred action purpose, output of a voice to the user by an audio output unit, wherein a plurality of target modes of speaking according to the action purpose of the user are stored in a memory, each of the plurality of target modes of speaking corresponding to each room in which the user may be located, each of the plurality of target modes of speaking defining at least a combination of volume, pitch and speed of the voice output by the audio output unit, such that each room has a corresponding combination of volume, pitch and speed of the voice output by the audio output unit, and the information processing method further comprises identifying, from among the plurality of target modes of speaking stored in the memory, based on the information of the room in which the user is located, a first target mode of speaking that corresponds to the inferred action purpose of the user, the first target mode of speaking defining a first combination of first volume, first pitch and first speed of the voice output by the audio output unit, receiving a sound collection result of collecting speaking of the user, identifying a mode of speaking of the user based on the received sound collection result, the identified mode of speaking of the user defining a second combination of second volume, second pitch and second speed, and controlling the output of the voice such that the combination of volume, pitch and speed of the voice output to the user by the audio output unit is gradually changed from (1) the second combination of the second volume, the second pitch and the second speed of the identified mode of speaking of the user identified based on the received sound collection result to (2) the first combination of the first volume, the first pitch and the first speed of the identified first target mode of speaking identified based on the information of the room in which the user is located.

14. The information processing device according to claim 1, wherein
it is defined, in the plurality of target modes of speaking, that a bedroom has a lower pitch and a lower volume than at least one of a living room and a kitchen.

15. The information processing device according to claim 1, wherein
it is defined, in the plurality of target modes of speaking, that a study room has a lower pitch and a lower volume than at least one of a living room and a kitchen.

16. The information processing device according to claim 1, wherein
it is defined, in the plurality of target modes of speaking, that a living room has a lower speed than at least one of a kitchen and a study room.

17. The information processing device according to claim 1, wherein
it is defined, in the plurality of target modes of speaking, that a bedroom has a lower speed than at least one of a kitchen and a study room.

* * * * *